United States Patent
Kaneyoshi et al.

(10) Patent No.: US 11,124,701 B2
(45) Date of Patent: Sep. 21, 2021

(54) PHOSPHOR PARTICLES

(71) Applicant: Shin-Etsu Chemical Co., Ltd., Tokyo (JP)

(72) Inventors: Masami Kaneyoshi, Echizen (JP); Kazuyuki Matsumura, Annaka (JP); Yoshiteru Sakatume, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 281 days.

(21) Appl. No.: 16/267,797

(22) Filed: Feb. 5, 2019

(65) Prior Publication Data

US 2019/0241799 A1    Aug. 8, 2019

(30) Foreign Application Priority Data

Feb. 6, 2018 (JP) ............................. JP2018-018882
Jul. 20, 2018 (JP) ............................. JP2018-136574

(51) Int. Cl.
*C09K 11/02* (2006.01)
*C09K 11/61* (2006.01)
*C09K 11/57* (2006.01)

(52) U.S. Cl.
CPC ............ *C09K 11/025* (2013.01); *C09K 11/57* (2013.01); *C09K 11/617* (2013.01)

(58) Field of Classification Search
CPC .............................. C09K 11/025; C09K 11/617
See application file for complete search history.

(56) References Cited

U.S. PATENT DOCUMENTS

| | | | |
|---|---|---|---|
| 7,497,973 B2 | 3/2009 | Radkov et al. | |
| 8,710,487 B2 | 4/2014 | Lyons et al. | |
| 8,974,696 B2 | 3/2015 | Kaneyoshi et al. | |
| 9,598,636 B2 | 3/2017 | Kaneyoshi et al. | |
| 9,670,403 B2 * | 6/2017 | Kajikawa | C09K 11/025 |
| 2016/0347998 A1 | 12/2016 | Kaneyoshi | |
| 2017/0313937 A1 | 11/2017 | Beers et al. | |

FOREIGN PATENT DOCUMENTS

| | | |
|---|---|---|
| JP | 2009-528429 A | 8/2009 |
| JP | 2012-224536 A | 11/2012 |
| JP | 2014-514388 A | 6/2014 |
| JP | 2014-141684 A | 8/2014 |
| JP | 2015-163670 A | 9/2015 |
| JP | 2017-095568 * | 6/2017 |
| JP | 2017-095568 A | 6/2017 |
| WO | 2017/192322 A1 | 11/2017 |

OTHER PUBLICATIONS

Translation for JP 2017-095568, Jun. 1, 2017.*
"Synthesis of Inorganic Compound III", New Experimental Chemistry Series #8, The Chemical Society of Japan (ed.), Maruzen Co., 1977, p. 1166, w/English translation (2 pages).

* cited by examiner

*Primary Examiner* — C Melissa Koslow (74) *Attorney, Agent, or Firm* — Westerman, Hattori, Daniels & Adrian, LLP (57) ABSTRACT

Provided are phosphor particles comprising Mn-doped complex fluoride red phosphor particles and inorganic fine particles which are affixed to the surface of each red phosphor particle. The Mn-doped complex fluoride red phosphor-containing phosphor particles are suppressed in mutual adhesion and agglomeration, flow well during mixing with a silicone or epoxy resin, and have excellent humidity resistance.

4 Claims, 4 Drawing Sheets

PHOSPHOR PARTICLES

CROSS-REFERENCE TO RELATED APPLICATION

This non-provisional application claims priority under 35 U.S.C. § 119(a) on Patent Application Nos. 2018-018882 and 2018-136574 filed in Japan on Feb. 6, 2018 and Jul. 20, 2018, respectively, the entire contents of which are hereby incorporated by reference.

TECHNICAL FIELD

This invention relates to Mn-doped complex fluoride red phosphor-containing phosphor particles useful for white LEDs.

BACKGROUND ART

Recently phosphors obtained by doping a complex fluoride of the formula: $A_2MF_6$ (wherein A is Na, K, Rb or Cs and M is Si, Ge or Ti) with manganese, i.e., Mn-doped complex fluoride red phosphors are used as red phosphors for white light emitting diodes (LEDs). One such example is described in Patent Document 1. There is concern that the Mn-doped complex fluoride red phosphors lack durability to humidity in the atmosphere (i.e., poor humidity resistance). Then, for example, Patent Documents 2 and 3 propose surface treatment for improving humidity resistance.

When the Mn-doped complex fluoride red phosphors are used as the red phosphor for LEDs, one common practice is to mix particles of the Mn-doped complex fluoride red phosphor with a silicone or epoxy resin prior to use. When mixed with the resin, the phosphor particles will agglomerate together directly or via the resin. Agglomeration can raise a problem when the phosphor particle/resin mixture is molded into a member. To overcome the problem, Patent Document 4 discloses Mn-doped complex fluoride red phosphor particles having non-luminescent fine particles affixed to their surface, and Patent Document 5 describes that Mn-doped complex fluoride red phosphor particles are improved in fluidity by adding oxide fine particles thereto.

CITATION LIST

Patent Document 1: JP-A 2009-528429 (U.S. Pat. No. 7,497,973)
Patent Document 2: JP-A 2014-141684 (U.S. Pat. No. 9,598,636)
Patent Document 3: JP-A 2014-514388 (U.S. Pat. No. 8,710,487)
Patent Document 4: JP-A 2017-095568
Patent Document 5: WO 2017/192322 (US 20170313937)
Patent Document 6: JP-A 2012-224536 (U.S. Pat. No. 8,974,696)
Patent Document 7: JP-A 2015-163670 (US 20160347998)
Non-Patent Document 1: New Experimental Chemistry Series #8, "Synthesis of Inorganic Compound III", The Chemical Society of Japan (ed.), Maruzen Co., p1166, 1977

SUMMARY OF INVENTION

An object of the invention is to provide Mn-doped complex fluoride red phosphor-containing phosphor particles which have improved humidity resistance, less agglomeration, and high flow.

As described above, there is a need for Mn-doped complex fluoride red phosphor particles which is unlikely to agglomerate together and maintains a high fluidity when they are mixed with a silicone or epoxy resin. Furthermore, while an illuminating device is constructed by mixing the phosphor with a resin and curing the resin such that the phosphor may be excited with a UV or blue LED, the phosphor itself should be durable in a highly humid environment, that is, have humidity resistance.

The inventors have found that the object is achieved by phosphor particles comprising 100 parts by weight of Mn-doped complex fluoride red phosphor particles having the formula (1):

$$A_2MF_6:Mn \tag{1}$$

wherein A is one or more alkali metals selected from Na, K, Rb, and Cs and M is one or more tetravalent elements selected from Si, Ge, and Ti, and 0.1 to 10 parts by weight of inorganic fine particles different from the Mn-doped complex fluoride, the Mn-doped complex fluoride red phosphor particles having an average particle diameter $D_{50}$ of at least 5 µm as measured by the laser diffraction scattering method, the inorganic fine particles having an average particle diameter $D_{50}$ of 1 nm to 2 µm as measured by the laser diffraction scattering method, and the inorganic fine particles being affixed to at least some parts on the surface of each Mn-doped complex fluoride red phosphor particle, preferably distributed over and affixed to the surface of each Mn-doped complex fluoride red phosphor particle. The phosphor particles have good humidity resistance, anti-agglomeration property, and fluidity, and offer a high work efficiency during mixing with a silicone, epoxy or similar resin. When Mn-doped complex fluoride red phosphor particles are used to construct LEDs, the LEDs are endowed with high reliability.

In one aspect, the invention provides phosphor particles comprising 100 parts by weight of Mn-doped complex fluoride red phosphor particles having the following formula (1):

$$A_2MF_6:Mn \tag{1}$$

wherein A is at least one alkali metal selected from Na, K, Rb, and Cs and M is at least one tetravalent element selected from Si, Ge, and Ti, and 0.1 to 10 parts by weight of inorganic fine particles different from the Mn-doped complex fluoride. The Mn-doped complex fluoride red phosphor particles have an average particle diameter $D_{50}$ of at least 5 µm, the inorganic fine particles have an average particle diameter $D_{50}$ of 1 nm to 2 µm, both as measured by the laser diffraction scattering method. The inorganic fine particles are affixed to at least some parts on the surface of each Mn-doped complex fluoride red phosphor particle.

Preferably, the inorganic fine particles are distributed over and affixed to the surface of each Mn-doped complex fluoride red phosphor particle.

In formula (1), A is an alkali metal which is preferably K, and M is a tetravalent element which is preferably Si.

In a preferred embodiment, the inorganic fine particles comprise an oxide, oxoacid salt, oxyfluoride or fluoride. More preferably, the inorganic fine particles comprise an oxide, oxyfluoride or fluoride of magnesium, silicon or yttrium. More preferably, the oxoacid salt comprises a sulfate or phosphate of a metal of Group 2 in the Periodic Table. Typically, the sulfate of a metal of Group 2 is barium sulfate, and the phosphate of a metal of Group 2 is magnesium phosphate.

In a preferred embodiment, the inorganic fine particles are hydrophobic silica fine particles which are formed by introducing $R^1SiO_{3/2}$ units and $R^2{}_3SiO_{1/2}$ units to the surface of hydrophilic silica fine particles composed of $SiO_2$ units, wherein $R^1$ is a substituted or unsubstituted monovalent hydrocarbon group of 1 to 20 carbon atoms, $R^2$ is a substituted or unsubstituted monovalent hydrocarbon group of 1 to 6 carbon atoms, and the silicon-bonded hydrocarbon groups $R^2$ are the same or different each other.

More preferably, the inorganic fine particles in the form of hydrophobic silica fine particles have an average particle diameter $D_{50}$ of 5 nm to 1 μm as measured by the laser diffraction scattering method, a $D_{90}/D_{10}$ value of up to 3, provided that particle size distributions $D_{10}$ and $D_{90}$ are measured by the laser diffraction scattering method, and an average circularity of 0.8 to 1.

Advantageous Effects of Invention

The Mn-doped complex fluoride red phosphor-containing phosphor particles of the invention are suppressed in mutual adhesion and agglomeration, flow well during mixing with a silicone or epoxy resin, and have excellent humidity resistance.

DESCRIPTION OF PREFERRED EMBODIMENTS

The Mn-doped complex fluoride red phosphor (also referred to as Mn-activated complex fluoride red phosphor) used herein has the following formula (1).

$A_2MF_6$:Mn     (1)

Herein A is one or more alkali metals selected from Na, K, Rb, and Cs, preferably K. M is one or more tetravalent elements selected from Si, Ge, and Ti, preferably Si.

The phosphor has a structure that M element in the crystal of a complex fluoride having the formula: $A_2MF_6$ (wherein A and M are as defined in formula (1)) is, in part, replaced by manganese (Mn). Mn is preferably a replacement as tetravalent element, that is, $Mn^{4+}$. The Mn-doped complex fluoride red phosphor emits red light having a luminescent peak, preferably maximum luminescent peak in a wavelength range of 600 to 660 nm, when excited with blue light of wavelength 420 to 490 nm. Of the Mn-doped complex fluoride red phosphors of formula (1), a KSF red phosphor in which Si of $K_2SiF_6$ (corresponding to $A_2MF_6$) is, in part, replaced by Mn, that is, $K_2SiF_6$:Mn or $K_2SiF_6$:$Mn^{4+}$ is most preferred.

One preferred example of the Mn-doped complex fluoride red phosphor is prepared by the method disclosed in Patent Document 6 (JP-A 2012-224536). The Mn-doped complex fluoride red phosphor may be prepared by adding a manganese compound of the formula: $Na_2MnF_6$ or $K_2MnF_6$ to at least one of a first solution containing a fluoride of a tetravalent element M wherein M is one or more elements selected from Si, Ge, and Ti, and a second solution containing a compound selected from a fluoride, hydrogenfluoride, nitrate, sulfate, hydrogensulfate, carbonate, hydrogencarbonate, and hydroxide of an alkali metal A wherein A is one or more metals selected from Na, K, Rb, and Cs, and/or a solid compound of the alkali metal A, and mixing the first solution with the second solution and/or the solid compound for thereby reacting the fluoride of tetravalent element M, the compound of alkali metal A, and the manganese compound.

In this method, the slurry formed during reaction is subjected to solid-liquid separation, for example, by filtration, centrifugation or decantation. The solid product thus recovered is a Mn-doped complex fluoride red phosphor. The solid product recovered by solid-liquid separation may be post-treated such as by washing or solvent exchange, and dried such as by vacuum drying, if necessary. Since the inorganic fine particles to be described below are affixed to the solid product, the solid product may be used not only in the dry state, but also in an unwashed state after solid-liquid separation, a wet (i.e., undried) state or a state after supernatant is removed from precipitate-settled liquid by decantation.

Another preferred example of the Mn-doped complex fluoride red phosphor is prepared by the method disclosed in Patent Document 7 (JP-A 2015-163670). The method comprises the steps of mixing powdered raw materials and heating the mix. Specifically, a Mn-doped complex fluoride red phosphor is prepared by mixing a solid complex fluoride of the formula: $A_2MF_6$ (wherein A is one or more alkali metals selected from Na, K, Rb, and Cs and M is one or more tetravalent elements selected from Si, Ge, and Ti) and a solid manganese compound of the formula: $Na_2MnF_6$ or $K_2MnF_6$ as raw materials and heating the mix at 100 to 500° C. In this method, a hydrogenfluoride salt of the formula: $A^1F.nHF$ (wherein $A^1$ is one or more alkali metals selected from Na, K, Rb, and Cs, or ammonium ($NH_4$)) may be added to the solid material(s) prior to heating.

In the reaction product, unreacted hexafluoromanganate may be left in admixture with the desired Mn-doped complex fluoride red phosphor. When a hydrogenfluoride salt is added for reaction promotion, the salt is also left behind. When it is desired to remove such impurities, the solid product may be post-treated such as by washing or solvent exchange, and dried such as by vacuum drying. Also in this case, the solid product may be used not only in the dry state, but also in a washed state, an unwashed state after solid-liquid separation, a wet (i.e., undried) state or a state where supernatant is removed from precipitate-settled liquid by decantation.

The Mn-doped complex fluoride red phosphor used herein is not limited to the exemplary products obtained by the above methods and may be prepared by any prior art well-known methods. For example, use may be made of a product obtained by dissolving or dispersing metal fluoride raw materials in hydrofluoric acid, and heating the solution or dispersion for evaporation to dryness, or a product obtained by completely dissolving metal fluoride raw materials in hydrofluoric acid, and cooling the solution or adding an organic solvent to the solution for lowering the solubility to induce precipitation.

In the Mn-doped complex fluoride red phosphor, the content of Mn is preferably at least 0.1 mol %, more preferably at least 0.5 mol %, and preferably up to 15 mol %, more preferably up to 10 mol %, based on the sum of tetravalent element M and Mn (i.e., M+Mn) which is 100 mol %. This proportion is correlated to the proportion of the amounts of tetravalent element M and Mn used as raw materials. A Mn content below the range may lead to weak absorption of excitation light whereas a Mn content in excess of the range may lead to a lowering of emission efficiency.

When a particle powder is analyzed for particle size distribution, $D_{10}$ designates a particle diameter corresponding to cumulative 10% by volume counting from the smallest side, $D_{50}$ designates a particle diameter corresponding to cumulative 50% by volume (i.e., volume basis median diameter or average particle size), and $D_{90}$ designates a particle diameter corresponding to cumulative 90% by volume. The Mn-doped complex fluoride red phosphor takes the form of particles and has a $D_{50}$ of at least 5 μm, preferably at least 7 μm. The particulate phosphor preferably has a $D_{90}$ of up to 100 μm, more preferably up to 70 μm, and a $D_{10}$ of at least 1 μm, more preferably at least 2 μm. If $D_{50}$ is below the range, scattering may become more prominent than absorption and conversion upon receipt of excitation light, and it is difficult to maintain satisfactory dispersion and fluidity after inorganic fine particles are affixed to the phosphor. Although the maximum of $D_{50}$ is not particularly limited, a $D_{50}$ value of up to 50 μm is preferred from its relationship to $D_{90}$. If $D_{90}$ exceeds the range, such particles may be inconvenient to admix with a resin. It is noted that a particle size may be determined by dispersing particles in a gas stream and measuring by the laser diffraction scattering method, for example, and this particle size measurement is applicable herein because a particle size distribution can be analyzed as well.

The Mn-doped complex fluoride red phosphor preferably has an internal quantum efficiency of at least 0.7 relative to blue excitation light of 450 nm. An internal quantum efficiency below the range is not practical because the majority of blue light is absorbed and lost before conversion to red light. The internal quantum efficiency is more preferably at least 0.75, even more preferably at least 0.8. The upper limit of internal quantum efficiency is typically up to about 0.98 although its theoretical upper limit is 1.

The phosphor particles of the invention comprise Mn-doped complex fluoride red phosphor particles as defined above and inorganic fine particles different from the Mn-doped complex fluoride. In the phosphor particle, the inorganic fine particles are affixed to at least some parts on the surface of each Mn-doped complex fluoride red phosphor particle, preferably distributed over and affixed to the surface of each Mn-doped complex fluoride red phosphor particle. The phosphor particles consisting of the Mn-doped complex fluoride red phosphor particles having inorganic fine particles affixed to their surface have good humidity resistance, anti-agglomeration property, and fluidity, and are effective to mix with a silicone, epoxy or similar resin. These advantages ensure that when the Mn-doped complex fluoride red phosphor particles are used in LEDs, the LEDs are endowed with high reliability.

Examples of the inorganic fine particles include metals and semimetals (i.e., metals and semimetals of Groups 1 to 16 in the Periodic Table, inclusive of transition metals) alone or compounds thereof. Fine particles of metals or semimetal compounds are preferred, with oxides, oxoacid salts, oxyfluorides and fluorides being more preferred. Especially, those highly transparent to excitation light and fluorescence are most preferred. Suitable metals and semimetals include magnesium (Mg), calcium (Ca), strontium (Sr), barium (Ba), aluminum (Al), silicon (Si), yttrium (Y), and zirconium (Zr). When the metal or semimetal compounds are oxides, oxyfluorides or fluorides, silicon, magnesium and yttrium are preferred. Compounds of such metals or semimetals are highly transparent, do not absorb excitation light or fluorescence, and are highly effective for improving humidity resistance. When the inorganic fine particles are silicon oxide (i.e., silica), they are commercially available, for example, as fumed silica under the trade name of AEROSIL series from Nippon Aerosil Co., Ltd. Although the inorganic fine particles may be irregular in shape, spherical particles are preferred.

In one embodiment wherein the inorganic fine particles are of silicon oxide (i.e., silica), hydrophobic silica is preferable. Fine particles of hydrophobic silica strongly adhere to the surface of Mn-doped complex fluoride red phosphor particles, and the phosphor particles obtained using hydrophobic silica have excellent humidity resistance. The hydrophobic silica is preferably obtained by starting with fine particles of hydrophilic silica composed of $SiO_2$ units and introducing $R^1SiO_{3/2}$ units and $R^2{}_3SiO_{1/2}$ units to the surface of the hydrophilic silica fine particles, wherein $R^1$ is a substituted or unsubstituted monovalent hydrocarbon group of 1 to 20 carbon atoms, $R^2$ is a substituted or unsubstituted monovalent hydrocarbon group of 1 to 6 carbon atoms, and the silicon-bonded hydrocarbon groups $R^2$ are the same or different each other. Examples of the unsubstituted monovalent hydrocarbon groups represented by $R^1$ and $R^2$ include alkyl groups such as methyl, ethyl and propyl, aryl groups such as phenyl, and aralkyl groups such as benzyl. Examples of the substituted monovalent hydrocarbon groups include substituted forms of alkyl, aryl and aralkyl groups in which one or more or even all hydrogen atoms are substituted by halogen atoms (e.g., fluorine), such as fluoromethyl, fluoroethyl, fluoropropyl, fluorophenyl and fluorobenzyl.

The fine particles of hydrophobic silica are obtained, for example, from surface treatment of hydrophilic silica fine particles. Specifically, the hydrophobic silica fine particles may be prepared by hydrolyzing a tetraalkoxysilane such as tetramethoxysilane to form fine particles of hydrophilic silica, contacting the fine particles on their surface with a trifunctional silane compound having a group corresponding to the monovalent hydrocarbon group $R^1$ (e.g., alkyltrialkoxysilane such as methyltrialkoxysilane) for treating the particle surface with the reaction product of the trifunctional silane compound, and further contacting the fine particles on their surface with a monofunctional silane compound having a group corresponding to $R^2$ (e.g., hexamethyldisilazane) to form a trimethylsilyl compound.

In another embodiment wherein the inorganic fine particles are of oxoacid salts, sulfates and phosphates are preferred. More preferred are oxoacid salts of metals of Group 2 in the Periodic Table. The metals of Group 2 are preferably magnesium (Mg), and calcium (Ca), strontium (Sr) and barium (Ba) which are alkaline earth metals. The salts of metals of Group 2 readily adhere to the surface of Mn-doped complex fluoride red phosphor particles, and the resulting phosphor particles have excellent humidity resistance. Of the sulfates of Group 2 metals, barium sulfate is most preferred. Of the phosphates of Group 2 metals, magnesium phosphate is most preferred.

The inorganic fine particles have a particle diameter $D_{50}$ of from 1 nm to 2 µm, preferably at least 5 nm and up to 1 µm. Fine particles with a $D_{50}$ below the range are likely to agglomerate together and no longer able to remain as primary particles, becoming less effective for imparting fluidity to the phosphor particles. Fine particles with a $D_{50}$ above the range fail to impart fluidity to the phosphor particles and allow the phosphor particles to agglomerate.

In the embodiment wherein the inorganic fine particles are of hydrophobic silica, the fine particles have a $D_{50}$ of preferably at least 5 nm, more preferably at least 10 nm, and most preferably at least 20 nm, and preferably up to 1 µm, more preferably up to 0.7 µm, and most preferably up to 0.5 µm. Since it is desired that relatively large particles be less, the $D_{90}/D_{10}$ value is preferably up to 3, more preferably up to 2.9. When the inorganic fine particles are of hydrophobic silica, the particles are preferably of spherical shape having an average circularity of 0.8 to 1. As used herein, the "average circularity" refers to a circularity computed from a two-dimensional projected image of a particle, that is, the circumference of a circle equal to the area of the projected image of the particle divided by the actual peripheral length of the projected image of the particle. Such hydrophobic silica readily adheres to the Mn-doped complex fluoride red phosphor particles. The fluidity is easily controlled using the hydrophobic silica.

A ratio between the Mn-doped complex fluoride red phosphor particles and the inorganic fine particles in the phosphor particles is preferably such that the inorganic fine particles are at least 0.1 part by weight and up to 10 parts by weight per 100 parts by weight of the Mn-doped complex fluoride red phosphor particles. The ratio may be adjusted by a ratio of both particle charges when the Mn-doped complex fluoride red phosphor particles and the inorganic fine particles are mixed, for example, by the method described below. Particularly when the inorganic fine particles are of hydrophobic silica, the ratio between the Mn-doped complex fluoride red phosphor particles and the inorganic fine particles is preferably such that the inorganic fine particles are at least 0.2 part by weight and up to 5 parts by weight per 100 parts by weight of the Mn-doped complex fluoride red phosphor particles.

The total of the Mn-doped complex fluoride red phosphor particles and the inorganic fine particles preferably accounts for at least 90% by weight, more preferably at least 95% by weight, and even more preferably at least 99% by weight of the phosphor particles. Most preferably, the phosphor particles consist essentially of the Mn-doped complex fluoride red phosphor particles and the inorganic fine particles, with other ingredients at the impurity level being acceptable.

The inorganic fine particles may be affixed to the surface of the Mn-doped complex fluoride red phosphor particles by any desired method, for example, by one of the following first to third methods.

The first method involves the step of dry mixing the Mn-doped complex fluoride red phosphor particles and the inorganic fine particles on a mixer such as a Henschel mixer, V blender, propeller mixer or planetary mixer.

The second method involves the steps of suspending or dispersing the Mn-doped complex fluoride red phosphor particles in a liquid, adding the inorganic fine particles in solid or dispersion form thereto, or alternatively suspending or dispersing the inorganic fine particles in a liquid, adding the Mn-doped complex fluoride in solid or dispersion form thereto, mixing the contents, and performing solid-liquid separation. The liquid may be selected from water and various organic solvents as long as the liquid does not dissolve the Mn-doped complex fluoride red phosphor particles and the inorganic fine particles. Typical examples of the liquid include water, hydrofluoric acid aqueous solution, ethanol, and acetone. A suspension or dispersion of the inorganic fine particles in a liquid is commercially available and useful. An exemplary product is silica sol under the trade name of Snowtex series by Nissan Chemical Industries, Ltd.

The third method involves the steps of suspending or dispersing the Mn-doped complex fluoride red phosphor particles in a liquid, adding thereto a soluble salt of a metal which is a constituent of the inorganic fine particles to be affixed, and a soluble compound containing a fluoride ion, hydroxide ion, sulfate ion, or phosphate ion for precipitation of the metal, both in solid or solution form, mixing the contents, thereby forming inorganic fine particles in the liquid where the Mn-doped complex fluoride red phosphor particles are present, and performing solid-liquid separation. The third method is applicable, for example, where the liquid is a hydrofluoric acid aqueous solution, the soluble salt of a metal is magnesium nitrate or yttrium nitrate, and the soluble compound is an alkali or ammonium fluoride, or where barium nitrate and a water-soluble sulfate are used.

In the second and third methods, the slurry formed by mixing is subjected to solid-liquid separation, for example, by filtration, centrifugation or decantation. The solid product thus recovered is phosphor particles. The mixture in the first method and the solid products after solid-liquid separation in the second and third methods may be post-treated such as by washing or solvent exchange, and dried such as by vacuum drying, if necessary.

EXAMPLES

Preparation Examples, Examples and Comparative Examples are given below by way of illustration and not by way of limitation.

Phosphor particles are observed under a scanning electron microscope (SEM), model JSM-6700F by JEOL Ltd. In connection with the particle size distribution, $D_{10}$ designates a particle diameter corresponding to cumulative 10 vol % counting from the smallest side, $D_{50}$ designates a particle diameter corresponding to cumulative 50 vol % (i.e., volume basis median diameter or average particle size), and $D_{90}$ designates a particle diameter corresponding to cumulative 90 vol %.

Preparation Example 1

Preparation of $K_2MnF_6$

Potassium hexafluoromanganate $K_2MnF_6$ was prepared in accordance with the procedure described in New Experimental Chemistry Series #8, "Synthesis of Inorganic Compound III", The Chemical Society of Japan (ed.), Maruzen Co., p1166, 1977 (Non-Patent Document 1).

A reaction vessel of vinyl chloride resin was divided into two compartments by a central partition of fluoroplastic ion exchange membrane, and platinum plates were set as anode and cathode in the compartments. A hydrofluoric acid solution having manganese(II) fluoride dissolved therein was fed to the anode side compartment and a hydrofluoric acid solution was fed to the cathode side compartment. A power supply was connected to the electrodes to carry out electrolysis at a voltage of 3 V and a current flow of 0.75 A. At the end of electrolysis, a potassium fluoride solution saturated with hydrofluoric acid was added in excess to the reaction solution in the anode side compartment. There formed a yellow precipitate (identified as $K_2MnF_6$), which was filtered and recovered.

Preparation Example 2 and Comparative Example 1

Preparation of KSF Red Phosphor Particles

First, 234 cm$^3$ of 40 wt % hydrosilicofluoric acid ($H_2SiF_6$) aqueous solution (Morita Chemical Industries Ltd.) was mixed with 2,660 cm$^3$ of 50 wt % hydrofluoric acid (HF) aqueous solution (trade name SA, by Stella Chemifa Corp., the same hereinafter). The $K_2MnF_6$ powder in Preparation Example 1, 13.32 g, was added to the mixture, which was stirred for dissolution to form a Si—Mn solution. Separately, 210.5 g of potassium hydrogenfluoride ($KHF_2$, Stella Chemifa Corp.) was mixed with 680 cm$^3$ of 50 wt % HF aqueous solution and 1,270 cm$^3$ of pure water and dissolved therein to form a K solution. With stirring, the K solution was added in small divided portions to the Si—Mn solution, whereupon a pale orange precipitate ($K_2SiF_6$:Mn) formed. The precipitate was filtered through a Buchner funnel and deliquored as much as possible. The thus obtained precipitate is designated KSF red phosphor particles (A). KSF red phosphor particles (A) obtained by the procedure until this step were later used in Examples 4, 5, and 7.

Next, 20 g of potassium silicofluoride ($K_2SiF_6$, Morita Chemical Industries Ltd.) was dissolved in 550 cm$^3$ of 50 wt % HF aqueous solution, to which the deliquored precipitate (KSF red phosphor particles (A)) was added and stirred for 10 minutes. The precipitate in the mixture was filtered through a Buchner funnel again, deliquored fully, and washed with spraying acetone. The precipitate thus obtained is designated KSF red phosphor particles (B). KSF red phosphor particles (B) obtained by the procedure until this step were later used in Examples 2 and 3.

The deliquored and washed precipitate (KSF red phosphor particles (B)) was vacuum dried. The precipitate thus obtained is designated KSF red phosphor particles (C). When all charges were processed to KSF red phosphor particles (C), there was obtained 184.9 g of KSF red phosphor particles (C). KSF red phosphor particles (C) obtained by the procedure until this step were later used in Examples 1 and 6 while they themselves were reported as Comparative Example 1.

Preparation Example 3 and Comparative Example 2

Preparation of KSF Red Phosphor Particles $K_2SiF_6$ powder, 253.8 g, and 21.64 g of $K_2MnF_6$ powder in Preparation Example 1 were placed in a zippered polyethylene bag and mixed for 5 minutes by slowly shaking and spinning the bag with hands. Then, 121.6 g of acidic potassium fluoride $KF.2HF$ (Morita Chemical Industries Ltd.) was added to the powder mixture, which was mixed for a further 2 minutes. The resulting powder mixture was divided in half. Two sets of gastight containers with a PTFE inner cylinder (internal volume 300 cm$^3$, TAF-SR300 by Sansyo Co., Ltd.) each were charged with the half portion and closed. These containers were heated in an oven at a temperature of 220° C. for 12 hours, and then allowed to cool down.

The reaction products were taken out and added to 1,000 cm$^3$ of pure water in a 2-L polyethylene beaker. While the mixture was slowly stirred, massive portions broke apart and turned to a powdery precipitate. The precipitate was filtered through a Buchner funnel, deliquored as much as possible, washed with a small amount of 5% hydrofluoric acid aqueous solution, then with spraying acetone, and vacuum dried, obtaining 281.5 g of a product. The product is designated KSF red phosphor particles (D). KSF red phosphor particles (D) were later used in Examples 8 and 9 while they themselves were reported as Comparative Example 2.

Particle Size Distribution of KSF Red Phosphor Particles

Figure 1:
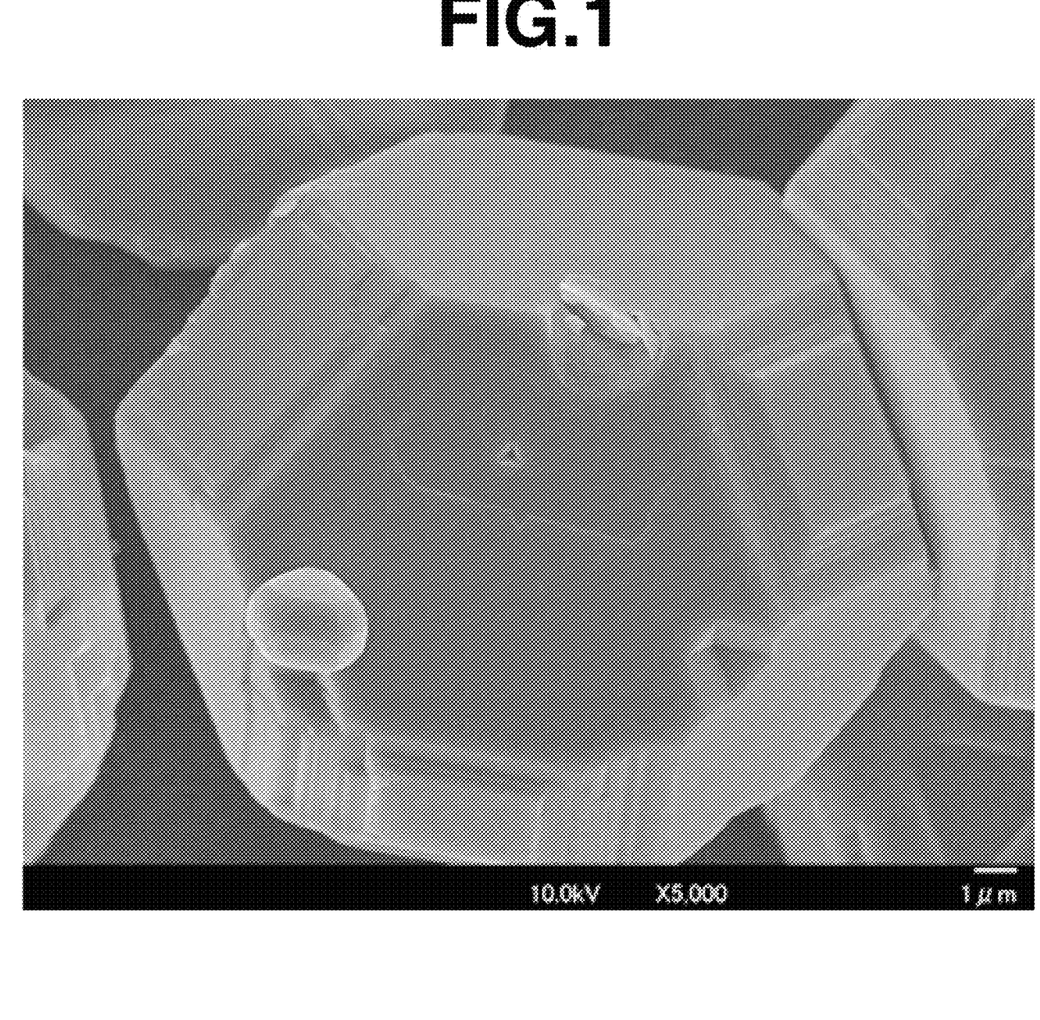
FIG. 1 is a SEM observation image of a Mn-doped complex fluoride red phosphor particle having no inorganic fine particles (different from the Mn-doped complex fluoride) affixed thereto in Comparative Example 1.

The particle size distribution of KSF red phosphor particles (C) of Comparative Example 1 was analyzed by a particle size distribution measurement system of gas stream dispersion type laser diffractometry (HELOS & RODOS, Sympatec GmbH). The results were $D_{10}$=8.4 µm, $D_{50}$=19.2 µm, and $D_{90}$=29.3 µm. The phosphor particles of Comparative Example 1 were observed under SEM, a micrographic image being shown in FIG. 1. The particle size distribution of KSF red phosphor particles (A) and KSF red phosphor particles (B) is regarded substantially the same as KSF red phosphor particles (C) because the particle diameter is substantially unchanged throughout the procedure which is run until KSF red phosphor particles (B) or KSF red phosphor particles (C) are obtained. The particle size distribution of KSF red phosphor particles (D) of Comparative Example 2 was similarly analyzed, with the results: $D_{10}$=7.9 µm, $D_{50}$=13.1 µm, and $D_{90}$=19.6 µm.

Preparation Example 4

Preparation of Hydrophobic Spherical Silica Fine Particles

Step 1: Synthesis of Hydrophilic Spherical Silica Fine Particles

A 3-liter glass reactor equipped with a stirrer, dropping funnel and thermometer was charged with 989.5 g of methanol, 135.5 g of water, and 66.5 g of 28% aqueous ammonia, which were mixed. After the solution was adjusted at 35° C., with stirring, 436.5 g (2.87 mol) of tetramethoxysilane was added thereto dropwise over 6 hours. After the completion of dropwise addition, stirring was continued for a further 0.5 hour for promoting hydrolysis, obtaining a suspension of hydrophilic spherical silica fine particles.

Step 2: Surface Treatment with Trifunctional Silane Compound

To the suspension from Step 1, 4.4 g (0.03 mol) of methyltrimethoxysilane was added dropwise over 0.5 hour at room temperature. After dropwise addition, stirring was continued for 12 hours to render the surface of silica fine particles hydrophobic, obtaining a dispersion of surface-treated spherical silica fine particles. After the glass reactor was coupled with an ester adaptor (or Dean-Stark trap) and condenser tube, the dispersion was heated at 60-70° C. to distil off methanol and water in a total amount of 1,021 g, yielding a dispersion concentrate. At this point, the content of the surface-treated spherical silica fine particles in the concentrate was 28 wt %.

Step 3: Surface Treatment with Monofunctional Silane Compound

To the dispersion concentrate from Step 2, 138.4 g (0.86 mol) of hexamethyldisilazane was added at room temperature. The dispersion was heated at 50-60° C. for 9 hours for reaction, that is, trimethylsilylating reaction of the spherical silica fine particles surface treated in Step 2. From the dispersion, the solvents were distilled off at 130° C. under a vacuum of 6,650 Pa, obtaining 186 g of hydrophobic spherical silica fine particles.

Particle Size Distribution and Shape of Hydrophobic Spherical Silica Fine Particles The hydrophobic spherical silica fine particles were added to methanol so as to give a concentration of 0.5 wt %. The particles were dispersed by 10 minutes of ultrasonic agitation. The dispersion was analyzed by a Nanotrac particle size distribution analyzer based on the dynamic light scattering/laser Doppler method (trade name UPA-EX150 by Nikkiso Co., Ltd.) to measure the particle size distribution of hydrophobic spherical silica fine particles. The results were $D_{10}=43$ nm, $D_{50}=52$ nm, and $D_{90}=95$ nm. $D_{90}/D_{10}$ as an index of particle diameter uniformity was 2.21.

The hydrophobic spherical silica fine particles were observed under a SEM Model S-4700 (Hitachi, Ltd., magnifying power ×$10^5$) for inspecting their shape. On visual inspection, all particles were of generally spherical shape. The circularity of particles was determined by analysis of two-dimensional projected images of particles. The particles had a circularity of 0.86. It is noted that the circularity is defined as the circumference of a circle equal to the area of the projected image of the particle divided by the actual peripheral length of the projected image of the particle.

Example 1

Figure 2:
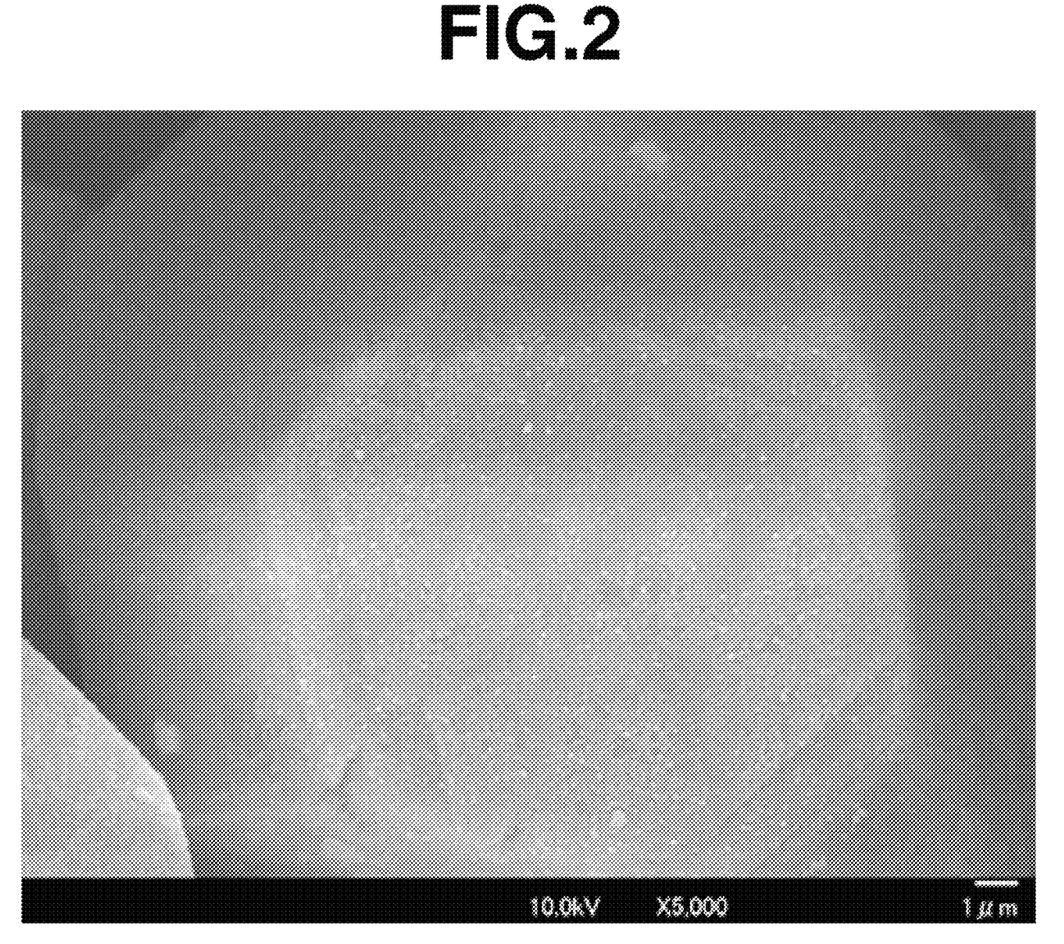
FIG. 2 is a SEM observation image of a phosphor particle having hydrophobic silica fine particles distributed over and affixed to the surface of a Mn-doped complex fluoride red phosphor particle in Example 1.

A planetary mixer (V-mini 300 by EME Corp.) with a plastic mixing container (~300 cm$^3$) was used. The container was charged with 140 g of KSF red phosphor particles (C) in Preparation Example 2 and 1.4 g of the hydrophobic spherical silica fine particles in Preparation Example 4, which were lightly mixed with a spatula. With the container kept under reduced pressure, the contents were mixed at a revolution speed of 1,000 rpm and a rotation speed of 500 rpm for 5 minutes, obtaining phosphor particles. In this case, the phosphor particles consisted of 100 parts by weight of the KSF red phosphor particles and 1 part by weight of the hydrophobic spherical silica fine particles. A SEM observation image of the phosphor particle is shown in FIG. 2. As seen from the image, the hydrophobic spherical silica fine particles were distributed over and affixed to the surface of the KSF red phosphor particle.

Example 2

By the same method as in Example 1, 140 g of KSF red phosphor particles (B) in Preparation Example 2 and 2.8 g of the hydrophobic spherical silica fine particles in Preparation Example 4 were mixed. The mixture was collected on a tray and vacuum dried, obtaining phosphor particles. In this case, the phosphor particles consisted of 100 parts by weight of the KSF red phosphor particles and 2 parts by weight of the hydrophobic spherical silica fine particles.

Example 3

Silica sol having silica (SiO$_2$) fine particles dispersed therein (Snowtex AK by Nissan Chemical Industries, Ltd., solid concentration 20 wt %, average particle diameter 10 to 15 nm), 28 cm$^3$, was diluted with 460 cm$^3$ of pure water. The dispersion was combined with 140 g of KSF red phosphor particles (B) in Preparation Example 2 and stirred for 30 minutes. The dispersion was filtered through a Buchner funnel to separate solids. The solids were deliquored as much as possible, washed with spraying acetone, collected on a tray, and vacuum dried, obtaining 137.3 g of phosphor particles. Since the silica sol contained 5.6 g of SiO$_2$, the phosphor particles consisted of 100 parts by weight of the KSF red phosphor particles and 4.3 parts by weight of the silica fine particles.

Example 4

Figure 3:
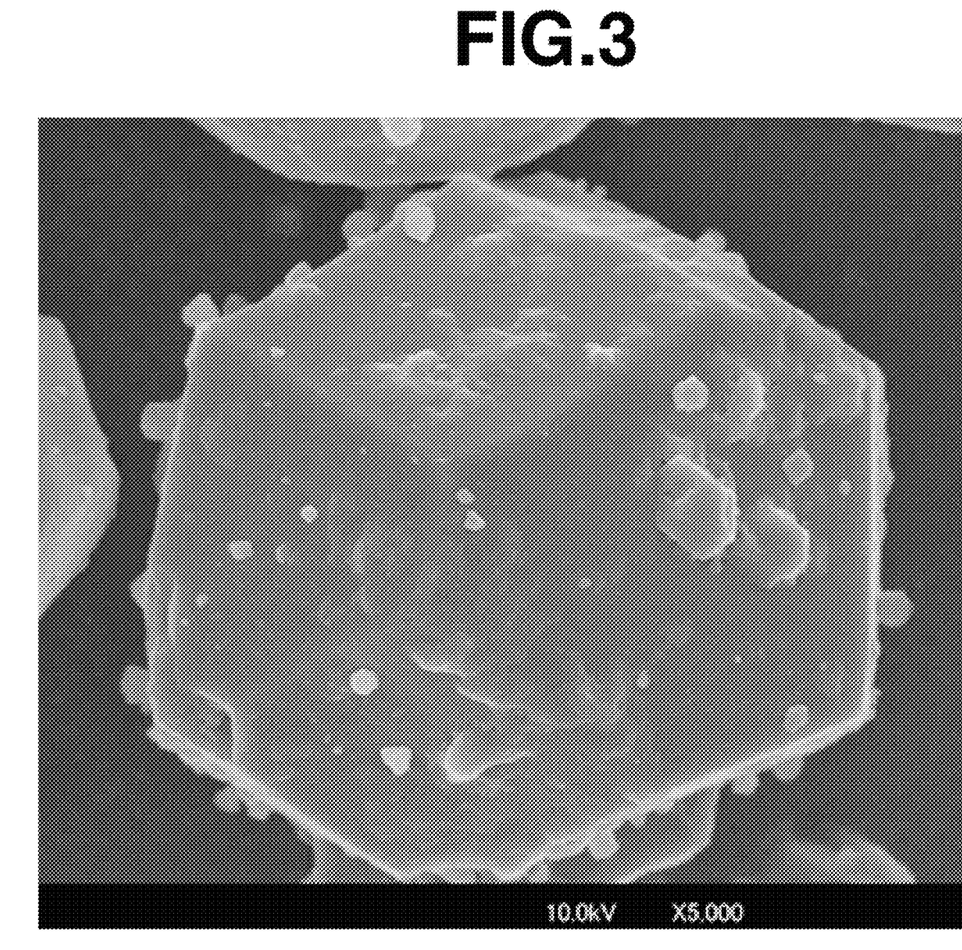
FIG. 3 is a SEM observation image of a phosphor particle having magnesium fluoride fine particles affixed to the surface of a Mn-doped complex fluoride red phosphor particle in Example 4.

K$_2$SiF$_6$, 14.5 g, was dissolved in 400 cm$^3$ of 50 wt % HF aqueous solution. KSF red phosphor particles (A) in Preparation Example 2, 140 g, was added to the solution and stirred, obtaining a KSF dispersion. Separately, 14.0 g (0.055 mol) of magnesium nitrate (Mg(NO$_3$)$_2$.6H$_2$O, JIS Special Grade) was dissolved in 30 cm$^3$ of pure water, obtaining a Mg solution. With stirring, the Mg solution was poured into the KSF dispersion, which was stirred for 30 minutes. The dispersion was filtered through a Buchner funnel to separate solids. The solids were deliquored as much as possible, washed with spraying acetone, collected on a tray, and vacuum dried, obtaining 135.2 g of phosphor particles. The content of magnesium in the phosphor particles was determined by dissolving the phosphor particles in hydrochloric acid and analyzing the solution by ICP emission spectrometry, finding a magnesium content of 0.66 wt %. In this case, the phosphor particles consisted of 100 parts by weight of the KSF red phosphor particles and 1.7 parts by weight of the fine particles (calculated as magnesium fluoride (MgF$_2$)). A SEM observation image of the phosphor particle is shown in FIG. 3. As seen from the image, the fine particles having a particle diameter of up to 1 μm were affixed to some parts on the surface of the KSF red phosphor particle.

Example 5

K$_2$SiF$_6$, 14.5 g, was dissolved in 400 cm$^3$ of 50 wt % HF aqueous solution. To the solution, 5.6 g of magnesium fluoride (MgF$_2$) fine particles (AIDL 30 by Stella Chemifa Corp., average particle diameter ~30 nm) were added and dispersed. Further, 140 g of KSF red phosphor particles (A) in Preparation Example 2 was added to the solution and stirred for 30 minutes. The dispersion was filtered through a Buchner funnel to separate solids. The solids were deliquored as much as possible, washed with spraying acetone, collected on a tray, and vacuum dried, obtaining 138.2 g of phosphor particles. In this case, the phosphor particles consisted of 100 parts by weight of the KSF red phosphor particles and 4.2 parts by weight of the magnesium fluoride (MgF$_2$) fine particles.

Example 6

By the same method as in Example 1, 140 g of KSF red phosphor particles (C) in Preparation Example 2 and 1.4 g of yttrium oxide (Y$_2$O$_3$) fine particles (NPS type by Shin-Etsu Chemical Co., Ltd., specific surface area 50 m$^2$/g) were mixed, obtaining phosphor particles. In this case, the phosphor particles consisted of 100 parts by weight of the KSF red phosphor particles and 1 part by weight of the yttrium oxide fine particles.

Example 7

K$_2$SiF$_6$, 14.5 g, was dissolved in 400 cm$^3$ of 50 wt % HF aqueous solution. To the solution, 6.0 g of yttrium oxide (Y$_2$O$_3$) fine particles as used in Example 6 were added and dispersed. Further, 140 g of KSF red phosphor particles (A) in Preparation Example 2 was added to the solution and stirred for 30 minutes. The dispersion was filtered through a Buchner funnel to separate solids. The solids were deliquored as much as possible, washed with spraying acetone, collected on a tray, and vacuum dried, obtaining 140.5 g of phosphor particles. The content of yttrium in the phosphor particles was determined by dissolving the phosphor particles in hydrochloric acid and analyzing the solution by ICP emission spectrometry, finding a yttrium content of 2.3 wt %. With regard to yttrium, it is believed that the surface of the yttrium oxide fine particles partly or entirely changed to fluoride, or yttrium oxide fine particles were once dissolved and then precipitated as fluoride or oxyfluoride. In this case, the phosphor particles consisted of 100 parts by weight of the KSF red phosphor particles and 3 parts by weight (calculated as yttrium oxide ($Y_2O_3$)) to 3.9 parts by weight (calculated as yttrium fluoride ($YF_3$)) of the fine particles.

Example 8

Figure 4:
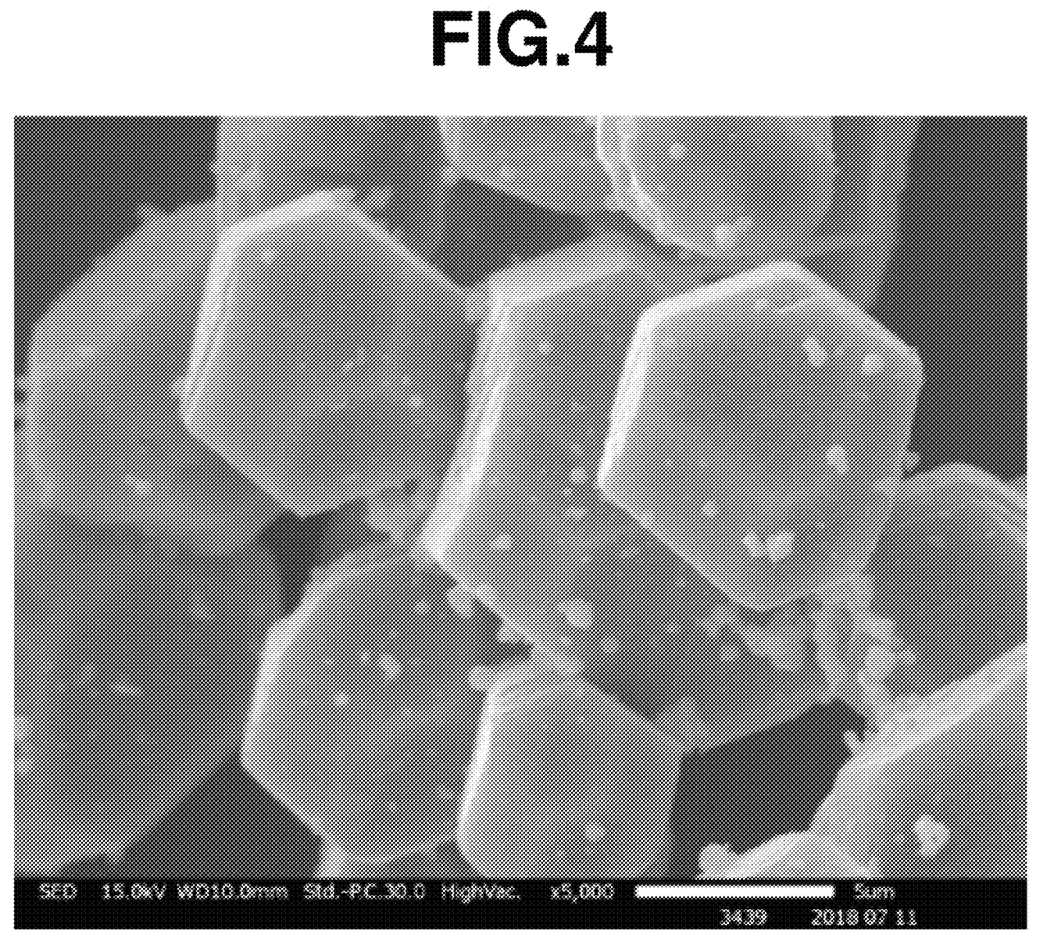
FIG. 4 is a SEM observation image of a phosphor particle having barium sulfate fine particles affixed to the surface of a Mn-doped complex fluoride red phosphor particle in Example 8.

To 360 cm³ of pure water, 3.14 g of barium nitrate (99.9% $Ba(NO_3)_2$, Wako Pure Chemical Industries, Ltd.) was added and dissolved. After dissolution, 4 cm³ of hydrogen peroxide (30% $H_2O_2$ aqueous solution, 1st Grade, Wako Pure Chemical Industries, Ltd.) was further added. KSF red phosphor particles (D) in Preparation Example 3, 140 g, was added to the solution and stirred for 10 minutes. Separately, 1.44 g of magnesium sulfate ($MgSO_4$, JIS Special Grade, Wako Pure Chemical Industries, Ltd.) was dissolved in 36 cm³ of pure water. The magnesium sulfate solution was added in small divided portions to the dispersion of phosphor particles over 5 minutes, and stirring was continued for a further 10 minutes. The dispersion was filtered through a Buchner funnel to separate solids. The solids were deliquored as much as possible, washed with spraying acetone, collected on a tray, and vacuum dried, obtaining 139.8 g of phosphor particles. The content of barium in the phosphor particles was determined by dissolving the phosphor particles in hydrochloric acid and analyzing the solution by ICP emission spectrometry, finding a barium content of 1.07 wt %. A SEM observation image of the phosphor particle is shown in FIG. 4. As seen from the image, the fine particles having a particle diameter of up to 1 μm were affixed to some parts on the surface of KSF red phosphor particles. On element qualitative analysis under an electron microscope, not only barium (Ba), but also sulfur (S) were detected at approximate levels corresponding to the fine particles. Provided that the fine particles were of barium sulfate ($BaSO_4$), the phosphor particles consisted of 100 parts by weight of the KSF red phosphor particles and 1.9 parts by weight (calculated as $BaSO_4$) of the fine particles.

Example 9

To 325 cm³ of pure water, 4.5 g of 40 wt % $H_2SiF_6$ solution was added and then 0.70 g of magnesium hydroxide ($Mg(OH)_2$ by Wako Pure Chemical Industries, Ltd.) was added and dissolved. After dissolution, 4 cm³ of $H_2O_2$ solution was further added. KSF red phosphor particles (D) in Preparation Example 3, 140 g, was added to the solution, which was stirred for 10 minutes. Separately, 1.6 g of diammonium hydrogenphosphate (($NH_4)_2HPO_4$, 1st Grade, Wako Pure Chemical Industries, Ltd.) was dissolved in 66 cm³ of pure water. The phosphate solution was added in small divided portions to the dispersion of phosphor particles over 6 minutes and stirring was continued for a further 20 minutes. The dispersion was filtered through a Buchner funnel to separate solids. The solids were deliquored as much as possible, washed with spraying acetone, collected on a tray, and vacuum dried, obtaining 135.7 g of phosphor particles. The content of magnesium in the phosphor particles was determined by dissolving the phosphor particles in hydrochloric acid and analyzing the solution by ICP emission spectrometry, finding a magnesium content of 0.15 wt %. On observation of the phosphor particle under SEM, the fine particles having a particle diameter of up to 1 μm were affixed to some parts on the surface of KSF red phosphor particles. On element qualitative analysis under an electron microscope, not only magnesium (Mg), but also phosphorus (P) were detected at approximate levels corresponding to the fine particles. Provided that the fine particles were of magnesium phosphate ($Mg_3(PO_4)_2$), the phosphor particles consisted of 100 parts by weight of the KSF red phosphor particles and 0.54 part by weight (calculated as $Mg_3(PO_4)_2$) of the fine particles.

Measurement of Angle of Repose and Bulk Density of Phosphor Particles

Using a powder tester (PT-X, Hosokawa Micron Corp.), the phosphor particles in Examples and Comparative Examples were measured for an angle of repose by the method according to JIS R 9301-2-2. The bulk density (aerated bulk density) was measured according to JIS K 5101. The results are shown in Table 1. When the particles have a smaller angle of repose or a greater bulk density (provided that the true densities are equivalent), bonding and agglomeration of phosphor particles are suppressed, indicating a good fluidity.

TABLE 1

|  | Angle of repose (°) | Bulk density (g/cm³) |
| --- | --- | --- |
| Example 1 | 33 | 1.31 |
| Example 2 | 33 | 1.27 |
| Example 3 | 30 | 1.11 |
| Example 4 | 32 | 1.48 |
| Example 5 | 32 | 1.45 |
| Example 6 | 38 | 1.29 |
| Example 7 | 35 | 0.93 |
| Example 8 | 37 | 0.89 |
| Example 9 | 37 | 0.92 |
| Comparative Example 1 | 41 | 0.66 |
| Comparative Example 2 | 48 | 0.58 |

Evaluation of Emission Characteristics and Humidity Resistance of Phosphor Particles The phosphor particles obtained in Examples and Comparative Examples were evaluated for emission characteristics and humidity resistance by the following tests. Using a quantum efficiency measuring system (QE1100 by Otsuka Electronics Co., Ltd.), the phosphor particles just as prepared were measured for absorbance and internal quantum efficiency relative to excitation light of 450 nm as initial emission characteristics. In the humidity resistance test, the phosphor particles were placed in an open small dish. The sample was held stationary in a bench-top type temperature & humidity chamber (SH-221 by Espec Corp.), which was kept at a temperature of 65° C. and a relative humidity of 90%, for 30 minutes or 7 days. The sample was similarly measured for internal quantum efficiency as emission characteristics after the humidity resistance test. The results are shown in Table 2 together with relative humidity resistance which is given by the internal quantum efficiency after the humidity resistance test relative to the initial internal quantum efficiency (=100%). The fluorescent emission spectrum included a group of several sharp peaks in the red region centering at the main peak wavelength of 631 nm, like the samples described in Patent Document 1 (JP-A 2009-528429).

TABLE 2

| | Initial emission characteristics (excitation at 450 nm) | | Humidity resistance test (internal quantum efficiency) | | Relative humidity resistance (%, initial = 100) | |
|---|---|---|---|---|---|---|
| | Absorbance | Internal quantum efficiency | 30 min | 7 days | 30 min | 7 days |
| Example 1 | 0.665 | 0.864 | 0.819 | 0.809 | 94.8 | 93.7 |
| Example 2 | 0.665 | 0.863 | 0.829 | 0.848 | 96.0 | 98.2 |
| Example 3 | 0.659 | 0.851 | 0.816 | 0.749 | 95.8 | 88.0 |
| Example 4 | 0.659 | 0.864 | 0.769 | 0.780 | 89.0 | 90.3 |
| Example 5 | 0.668 | 0.876 | 0.798 | 0.848 | 91.1 | 96.8 |
| Example 6 | 0.656 | 0.877 | 0.830 | 0.816 | 94.6 | 93.0 |
| Example 7 | 0.661 | 0.858 | 0.824 | 0.804 | 96.0 | 93.7 |
| Example 8 | 0.717 | 0.873 | 0.850 | 0.840 | 97.4 | 96.2 |
| Example 9 | 0.719 | 0.865 | 0.845 | 0.816 | 97.7 | 94.4 |
| Comparative Example 1 | 0.647 | 0.850 | 0.736 | 0.728 | 86.6 | 85.6 |
| Comparative Example 2 | 0.723 | 0.841 | 0.728 | 0.719 | 86.5 | 85.5 |

Japanese Patent Application Nos. 2018-018882 and 2018-136574 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. Phosphor particles comprising 100 parts by weight of Mn-doped complex fluoride red phosphor particles having the following formula (1):

$$A_2MF_6:Mn \quad (1)$$

wherein A is at least one alkali metal selected from Na, K, Rb, and Cs and M is at least one tetravalent element selected from Si, Ge, and Ti, and 0.1 to 10 parts by weight of inorganic fine particles different from the Mn-doped complex fluoride, the Mn-doped complex fluoride red phosphor particles having an average particle diameter $D_{50}$ of at least 5 μm, the inorganic fine particles having an average particle diameter $D_{50}$ of 1 nm to 2 μm, both as measured by the laser diffraction scattering method, and the inorganic fine particles being affixed to at least some parts on the surface of each Mn-doped complex fluoride red phosphor particle, wherein the inorganic fine particles are hydrophobic silica fine particles which are formed by introducing $R^1SiO_{3/2}$ units and $R^2{}_3SiO_{1/2}$ units to the surface of hydrophilic silica fine particles composed of $SiO_2$ units, wherein $R^1$ is a substituted or unsubstituted monovalent hydrocarbon group of 1 to 20 carbon atoms, $R^2$ is a substituted or unsubstituted monovalent hydrocarbon group of 1 to 6 carbon atoms, and the silicon-bonded hydrocarbon groups $R^2$ are the same or different each other.

2. The phosphor particles of claim 1 wherein the inorganic fine particles are distributed over and affixed to the surface of each Mn-doped complex fluoride red phosphor particle.

3. The phosphor particles of claim 1 wherein in formula (1), A is an alkali metal which is K and M is a tetravalent element which is Si.

4. The phosphor particles of claim 1 wherein the inorganic fine particles in the form of hydrophobic silica fine particles have an average particle diameter $D_{50}$ of 5 nm to 1 μm as measured by the laser diffraction scattering method, a $D_{90}/D_{10}$ value of up to 3, provided that particle size distributions $D_{10}$ and $D_{90}$ are measured by the laser diffraction scattering method, and an average circularity of 0.8 to 1.

* * * * *